Figure 1:
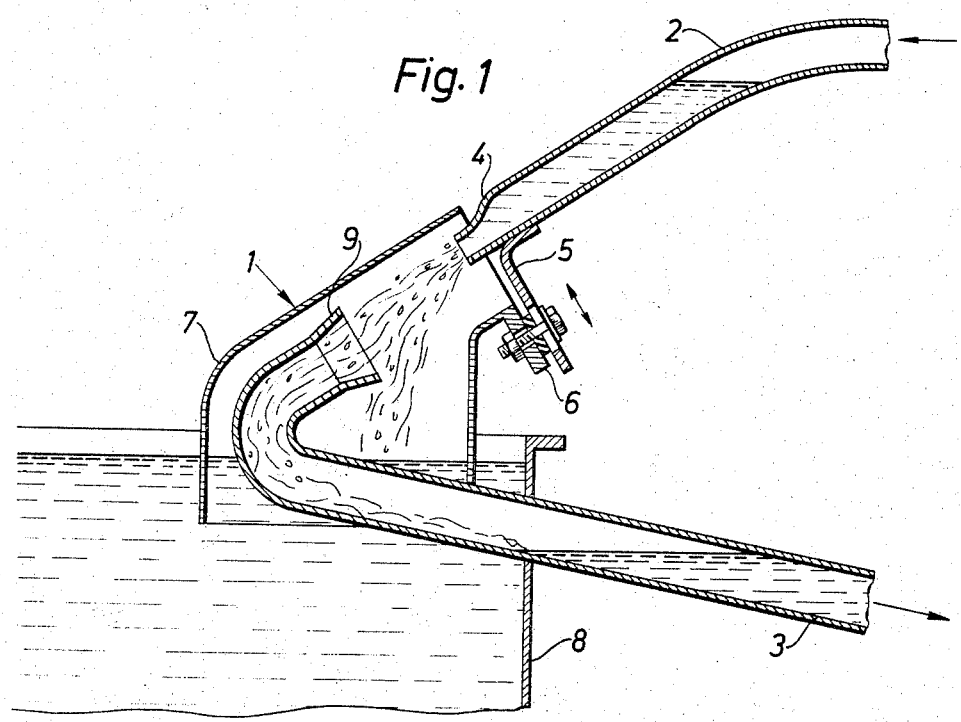

United States Patent [19]

Gustavsson

[11] 3,731,811
[45] May 8, 1973

[54] APPARATUS FOR ADJUSTING THE CONCENTRATION OF A CIRCULATING LIQUID SUSPENSION TO A DETERMINED, CONSTANT VALUE

[75] Inventor: Karl Axel Goran Gustavsson, Enkoping, Sweden

[73] Assignee: Aktiebolaget Bahco Ventilation, Enkolsing, Sweden

[22] Filed: June 19, 1970

[21] Appl. No.: 47,682

[30] Foreign Application Priority Data

July 2, 1969 Sweden ..............................9436/69

[52] U.S. Cl. ..................210/194, 210/519, 210/532
[51] Int. Cl. .............................................B01d 17/00
[58] Field of Search......................210/538, 519, 532, 210/513, 83, 65, 539, 540, 511, 194, 74; 209/157, 458; 55/228

[56] References Cited

UNITED STATES PATENTS

| | | | |
|---|---|---|---|
| 2,875,898 | 3/1959 | Spencer | 209/458 |
| 2,660,305 | 11/1953 | Labouygues | 209/157 X |
| 3,509,997 | 5/1970 | Tomlinson | 209/458 |

Primary Examiner—Reuben Friedman
Assistant Examiner—F. F. Calvetti
Attorney—Stevens, Davis, Miller & Mosher

[57] ABSTRACT

An apparatus for controlling the concentration of a circulating liquid suspension comprising a non-vertical nozzle and a funnel spaced therefrom in the direction of flow of liquid from the nozzle. Effluent having a concentration and viscosity above a predetermined value partially falls outside the funnel and effluent of the predetermined or lower concentration and viscosity is caught by the funnel to be recirculated. The critical value of the concentration and viscosity for the separation can be controlled by adjusting the angle of the nozzle or the spacing between it and the funnel.

4 Claims, 2 Drawing Figures

APPARATUS FOR ADJUSTING THE CONCENTRATION OF A CIRCULATING LIQUID SUSPENSION TO A DETERMINED, CONSTANT VALUE

The invention relates to an apparatus for adjusting the concentration of a circulating liquid suspension by introducing to the system material which increases the concentration of the suspension, and which apparatus is particularly usable in different dispersions such as aqueous slurries and other liquid slurries.

The apparatus of this invention may be used, e.g. for maintaining constant the concentration of an absorption liquid, circulating in a scrubber system for separating sulfur dioxide by means of a lime-containing absorption liquid, as described for example in U.S. Pat. application Ser. No. 763,124 filed Sept. 27, 1968, now abandoned.

The object of the invention is to enable by simple means the concentration of the dissolved or dispersed phase to be maintained constant in circulating liquids, and to these ends the apparatus of the invention has been constructed and described in the accompanying claims.

The invention is based on the understanding that when a liquid is caused to flow through a nozzle which extends in a direction that deviates from the vertical axis the rate of flow of the liquid, and consequently also the distance travelled by the flow will decrease with increasing concentration and therewith increasing viscosity. By placing a capture funnel at some suitable distance from the nozzle orifice in the flow direction, it is possible to obtain a separation whereby liquid in the circulation system having a higher viscosity and concentration than desired partially falls outside the capture funnel and is passed to a collecting vessel, while the liquid having a lower viscosity than desired is passed into the capture funnel and circulated back into the circulation circuit while collecting a thickening material from the funnel. If it is desired for some reason to adjust the concentration of the suspension to another, determined value which it is desired to maintain constant, the mutual positioning of the nozzle and the capture funnel is simply readjusted so that a greater or smaller portion of the flow passes into the funnel. To these ends, the position of the nozzle and/or the position of the funnel or the position of any portion of the latter can be changed.

Figure 2:
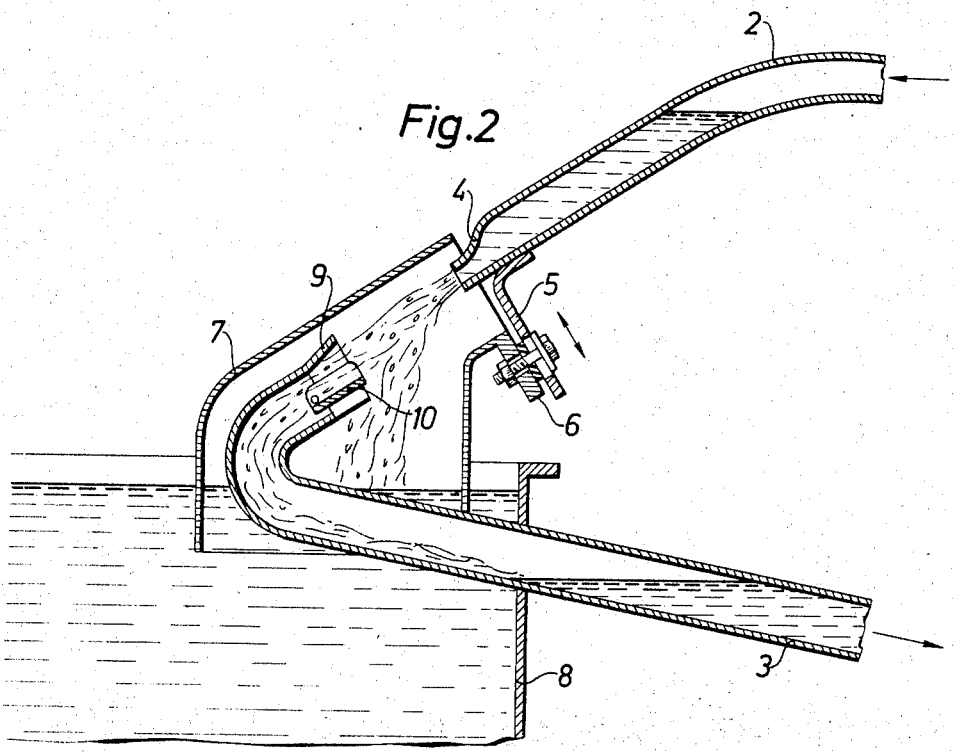

The invention will now be described in more detail with reference to the accompanying drawings, of which FIG. 1 illustrates in cross section an embodiment of the apparatus according to the invention provided with an adjustable nozzle, and FIG. 2 shows in cross section another embodiment of the apparatus of the invention in which a portion of the capture funnel has been made adjustable.

In FIG. 1 the reference numeral 1 indicates the complete regulating means. The regulating means is connected in a circulation system by means of an outlet pipe 2 and an inlet pipe 3. The outlet pipe is flexible and/or capable of being moved laterally and its lower end is provided with an adjustable nozzle 4 which is cylindrical at the discharged end thereof and secured to a slotted holder 5. The holder 5 is movably secured by means of a screw through the slots to a projection 6 on a casing 7 provided with an upper opening in which the discharge portion of the nozzle 4 is inserted and a lower opening which opens out beneath the level of the liquid present in a collecting vessel 8, e.g. a thickener. The upper end of the inlet tube 3 is in the form of a capture funnel 9 and is positioned in front of the nozzle in the direction in which the effluent is discharged therefrom, and is then curved down and passes via the lower opening of the casing 7 out through the side wall of the collecting vessel 8.

The outlet pipe 2 may, e.g., be connected to a droplet separator present in a scrubber according to the previously mentioned U.S. Pat. application Ser. No. 763.424 or similar apparatus for removing $SO_2$ from flue gases. In such a case, water containing suspended solids, mainly calcium bisulfite, enters through pipe 2. The collecting vessel 8 will be a settling tank included in the system to separate the sludge, while pipe 3 will be connected to a conduit for returning liquid to the scrubber. Clarified liquid will also be returned from the vessel 8 to the scrubber. Also, a lime dissolver is included wherein lime is introduced and dissolved in water and the solution supplied to the circulating liquid to maintain its concentration of lime, as described more in detail in application Ser. No. 763.424.

In the scrubber the liquid takes up $SO_2$ and also solid impurities and a sludge is formed which is to be removed. The apparatus of the present invention is suitable for withdrawing a certain portion of absorption liquid having a sludge concentration above a certain value to the settling tank while allowing remaining absorption liquid to return to the scrubber.

When a dispersion, e.g. a slurry from a droplet separator in a scrubber system, flows out through the inlet pipe 2 and passes in the form of a jet into the surroundings from the nozzle 4, the distance covered by the jet issuing from the nozzle 4 will vary in dependence on the concentration of the dispersion and thereby the viscosity. A smaller or larger portion of the flow will thus fall outside the capture funnel 9 and is passed to the collecting vessel 8. The remainder of the flow passes into the funnel, and in through the inlet pipe 3 for further circulation and in the process takes up concentration — increasing material present in a collecting vessel or the like.

By loosening the holder 5 and moving it in its longitudinal direction, it is possible to raise the position of the nozzle laterally and therewith also the percentage of the flow striking the capture funnel. In this way it is possible to increase or decrease the concentration which is desired to be held constant in the circulation circuit, by ensuring that a larger or smaller portion of the dispersion is captured by the funnel and passed back to the circulation system.

The embodiment illustrated in FIG. 2 differs in one respect from the embodiment illustrated in FIG. 1. In the embodiment of FIG. 2 the capture funnel 9 is provided with an adjustable flap-like portion 10, by means of which it is possible to change the area of the mouth of the funnel so that fine adjustments can be made with respect to the quantity of liquid passing through the capture funnel.

In the illustrated embodiments the nozzle can be displaced vertically. It may, however, also be vertically rotatable. Naturally, the inlet pipe in both cases must also have a suitable degree of flexibility. Adjustment of the nozzle can be effected manually, as shown, or automatically by means of suitable regulating means. This is also true of the adjustable capture-funnel portion illustrated in FIG. 2.

What is claimed is:

1. A scrubber system including means for recirculating a liquid suspension through the system comprising a nozzle adapted to discharge the said liquid at an angle which deviates from the vertical axis, means comprising a funnel spaced from the nozzle and adapted to receive liquid emerging from the nozzle and recirculate it to the scrubber, means for varying the distance between the nozzle and funnel to thereby control the volume of liquid entering the funnel, and means for collecting liquid which emerges from the nozzle and escapes said funnel, whereby liquid emerging from the nozzle is separated into two portions, one portion failing to traverse the distance between the nozzle and funnel, and the other portion entering the funnel.

2. An apparatus according to claim 1, characterized in that the nozzle is adjustable and the capture funnel fixed.

3. An apparatus according to claim 1, characterized in that the nozzle is fixed and the capture funnel or a portion thereof is adjustably arranged.

4. An apparatus according to claim 1, characterized in that at least the capture funnel is surrounded by a casing having an upper and a lower opening, the nozzle being secured to the casing by means of a holder and the discharge portion of the nozzle projecting into the upper opening and the lower opening being in liquid communication with the collecting means.

* * * * *